April 9, 1946.　　　　J. BOLSEY　　　　2,397,915

DIAPHRAGM ADJUSTING MECHANISM

Filed Jan. 27, 1944

INVENTOR.
JACQUES BOLSEY
BY

Patented Apr. 9, 1946

2,397,915

UNITED STATES PATENT OFFICE 2,397,915

DIAPHRAGM ADJUSTING MECHANISM

Jacques Bolsey, New York, N. Y.

Application January 27, 1944, Serial No. 519,903

3 Claims. (Cl. 95—64)

My present invention relates to photographic cameras, and more particularly to diaphragm adjusting means for such cameras.

It is an object of my present invention to provide adjusting means of an entirely new type which are extremely simple in construction and nevertheless efficient in operation.

It is a further object of my present invention to provide adjusting means which are located substantially on the face of the camera body and not within the same.

It is another object of my invention to provide adjusting means which are operated by turning of dials arranged on the top of the camera body.

It is still another object of my present invention to provide adjusting means which consist mainly of flat metal strip members which do not need considerable space and thus enable keeping the size of the camera small.

With the above objects in view, my present invention mainly relates to photographic cameras provided with a camera lens, an adjustable lens mount carrying this lens, and a camera body housing this lens and lens mount, and consists in the combination of a controlling member secured to the above mentioned camera body turnably in a plane which is parallel to the optical axis of the lens, a connecting member arranged movably in a plane which is parallel to the plane of turning of this controlling member, and two motion transmitting connections, one between the turnable controlling member and one end portion of the connecting member enabling movement of this connecting member in the plane defined above, and the other between the other end portion of the connecting member and a part of the lens mount; thus, the above defined connecting member and the motion transmitting connections enable adjustment of the lens mount by the controlling member, whenever required.

I wish to note that in all preferred embodiments of my present invention the connecting member is arranged movably in a plane which is parallel to the plane of turning of the controlling member; however, this is not absolutely necessary since movement of the connecting member in another plane during motion transmission is theoretically also possible. However, in this latter case it is absolutely necessary that there be a sliding connection, e. g. of the pin and slot type, between the connecting member and the controlling member on the one hand and the connecting member and the lens mount or part thereof on the other hand. Of course, it is not only possible but even preferable to provide sliding connections of the above described types also in constructions in which the connecting member and the controlling member are arranged and moving, e. g. sliding and turning, in two planes parallel to each other.

In accordance with a preferred embodiment of my invention, the controlling member or members are arranged on a face of the camera body which is parallel to the optical axis of the camera lens. In this connection, I wish to mention that the term "face" as used in the following description and claims is intended to define and include not only constructions in which the controlling members, e. g. focus or diaphragm adjusting dials, are located on an outer face of the camera body, but also constructions in which these members are arranged on an inner face of the camera body, e. g. on the face of a partition wall arranged parallel to the top or other outer face of the camera body.

I wish further to mention that, as explained below in detail, the connecting member or members which might consist of a double armed lever or a sliding member moving in direction of its longitudinal axis are preferably arranged and moving in a plane parallel to the optical axis of the lens and more particularly in a plane parallel to a face of the camera body which is parallel to this axis. In this connection, I wish to stress that the definition "in a plane" is not intended to limit the shape of the connecting member to a flat strip member arranged exclusively in one plane, but that this connecting member might be combined of two or more parts arranged and moving in various planes each of which is parallel to the optical axis of the lens, and sometimes also parallel to a face of the camera body which in turn is parallel to this optical axis.

More specifically, my new invention consists of two controlling members, one for adjusting the diaphragm and the other for focusing the camera lens. Each of these controlling members cooperates with a connecting member. One of these connecting members cooperates with a part of the lens mount for moving the same in direction of the optical axis of the lens in order to focus the lens and the other cooperates with diaphragm adjusting means carried by the lens mount.

As mentioned above, the controlling members are arranged preferably in a plane parallel to the optical axis of the lens on a face of the camera body which is also parallel to this axis, rotatably about their respective axis. The connecting members are preferably arranged in planes parallel to the above mentioned face of the camera body.

Each of these connecting members might be either rotatable about a pivoting axis and thus have for instance a shape of a double armed lever, or be longitudinal and slidable to and fro in longitudinal direction. The connections of these connecting members with the respective controlling members are preferably of the sliding type, e. g. so-called pin and slot connections. Similarly, it is preferable to provide slidable connections of similar type also between these connecting members and the adjustable part of the lens mount and the diaphragm adjusting means, respectively.

Although, as mentioned above, each of the connecting members might be slidable or turnable, I prefer to use for adjustment of the diaphragm a longitudinal connecting member adapted to slide to and fro in longitudinal direction and arranged with its longitudinal axis in a plane parallel to the top face of the camera body and simultaneously in a plane normal to the optical axis of the lens. In this preferred embodiment of my invention I provide for focus adjusting a turnable connecting member, e. g. a turnable double armed lever pivoted to the camera body and cooperating with the focus controlling member on the one hand and the adjustable lens mount on the other hand. Furthermore, this preferred embodiment of my invention is provided with four sliding connections: one between the focus controlling member and one end of the connecting double armed lever, one between the other end of this connecting double armed lever and an adjustable part of the lens mount, one between the diaphragm controlling member and one end of the slidable longitudinal connecting member, and finally one between the other end of this slidable longitudinal connecting member and the diaphragm adjusting means carried by the lens mount.

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
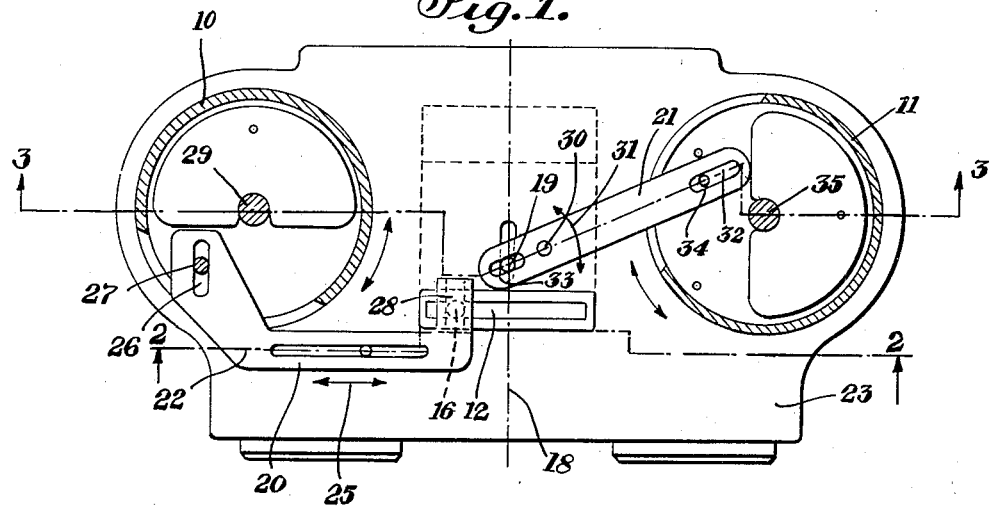
Fig. 1 is a longitudinal cross section through a photographic camera according to my present invention, along line 1—1 of Fig. 3.
Figure 2:
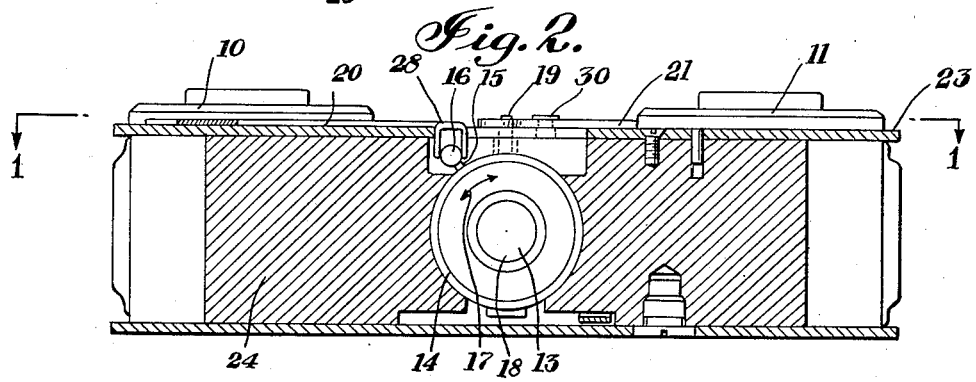
Fig. 2 is another longitudinal section through the same camera along line 2—2 of Fig. 1.
Figure 3:
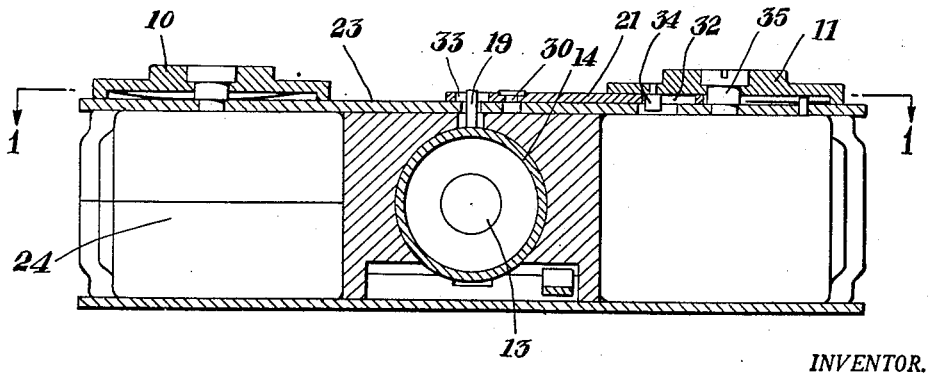
Fig. 3 is still a further section through the same camera along line 3—3 of Fig. 1.

As shown in Fig. 1, the adjusting and controlling mechanism provided in accordance with my present invention comprises two circular dials 10 and 11 serving as controlling members: dial 10 serves for controlling and adjusting the diaphragm mechanism 12 and dial 11 serves for controlling correct focusing of lens 13, carried by lens mount 14.

For purposes of adjusting the diaphragm mechanism, the same is provided with pin 15 having a ball-shaped end portion 16. By turning this pin 15 at its ball-shaped end portion 16 in direction of arrow 17 about the optical axis 18 of camera lens 13 relative to lens mount 14, the diaphragm 12 is adjusted in well-known manner. In similar way, camera lens 13 is focused by moving the entire lens mount 14 in direction of the optical axis 18 by means of pin 19 secured to the top of the lens mount.

The purpose of the present invention is to provide extremely simple, space saving and simultaneously efficient operative motion transmitting connections between the controlling dials 10, 11 and the diaphragm adjusting and focus controlling pins 15, 19, respectively. These motion transmitting connections consist on the one hand of the slidable longitudinal connecting member 20 and on the other hand of the turnable double armed lever 21: the longitudinal connecting member 20 is substantially strip-shaped and arranged with its longitudinal axis 22 in a plane parallel to the top face 23 of the camera body 24; simultaneously this longitudinal axis lies also in a plane normal to the optical axis 18 of the camera lens. This slidable longitudinal connecting member 20 is arranged slidably to and fro in direction of its longitudinal axis 22 as indicated by arrow 25.

One end of the slidable connecting member 20 is provided with slot 26 engaging pin 27 secured to dial 10. The other end of member 20 is provided with a fork-shaped extension 28 engaging the ball-shaped end portion 16 of pin 15, serving as explained for adjusting the diaphragm opening. It is evident and need not be further explained that by turning dial 10 about its pivoting axis 29 the connecting member 20 is moved in direction of arrow 25, thereby turning the diaphragm adjusting means about the optical axis 18 of the lens in direction of arrow 17, thus adjusting the diaphragm opening as required. I wish to mention that it is of great importance that the fork-like extension 28 of the longitudinal connecting member 20 is channel-shaped since this permits movement of lens mount 14 for focusing purposes in direction of the optical axis 18 without any danger of disengagement of connecting member 20 and the ball shaped end portion 16 of pin 15 forming part of the diaphragm adjusting means.

As mentioned above, the double armed lever 21 serves for focusing purposes. This lever 21 is secured by means of pivot 30 to the top face 23 of camera body 24 turnably in direction of arrow 31. This lever 21 is furthermore provided with two slots 32 and 33 at its two ends: slot 32 engages pin 34 secured to dial 11, thereby enabling turning of lever 21 about pivot 30 in direction of arrow 31 by turning dial 11 about its pivoting point 35; slot 33 in lever 21 engages pin 19 secured to lens mount 14 in such a manner as to enable sliding of this lens mount to and fro in axial direction by turning the lever 21 about its pivot 30. Thus, it is evident that by turning dial 11 lever 21 is turned about pivot 30 in direction of arrow 31 as explained above and simultaneously, by means of slot 33 and pin 19, lens mount 14 is moved in direction of the optical axis 18 of lens 13.

As already mentioned above, it is also possible to provide above the dials 10 and 11 a second outer wall and thus to arrange these dials entirely inside the camera body 24. Of course, in this case, the dials should preferably be larger so as to project over the side walls of the camera and to enable turning of the same by pressing against their edges. Furthermore, it is of course also possible to shape the connecting members 20 and 21 otherwise, e. g. to provide a double armed lever 21, the two lever arms of which are arranged in two parallel planes and connected with each other only by pivot 30; in this case, however, this pivot 30 has to be journalled rotatably in a wall of the camera body 24.

It is furthermore also possible to provide for adjusting of the diaphragm a double armed lever of the type described above for focusing purposes and, vice versa, to provide for focusing purposes a slidable longitudinal connecting member of the type disclosed above for adjusting the diaphragm opening.

Of course, it is furthermore also possible to provide for both diaphragm adjusting and focus controlling purposes longitudinal slidable members or for both these purposes turnable double armed levers. In case of such modifications and variations it is only important to keep in kind that the diaphragm adjusting means have to be in operative position engaging the diaphragm mechanism in every possible position of the lens mount into which the same may slide during focusing.

It will be understood that each of the elements described above, or two or more together, may also find a useful application in other types of cameras differing from the types described above.

While I have illustrated and described the invention as embodied in photographic cameras provided with controlling members arranged on the top face of the camera body, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a photographic camera, a camera lens, a lens mount carrying said lens slidable in direction of the optical axis of said lens, a camera body housing said slidable lens and lens mount and having an at least substantially flat face being parallel to said optical axis of said camera lens, an adjustable diaphragm member carried by said lens mount, adjusting means on said diaphragm member for adjusting the same, a diaphragm controlling member arranged on said face of said camera body, means turnably securing said controlling member to said face of said camera body, a movable connecting member being arranged in a plane parallel to said face of said camera body, a sliding connection between said controlling member and one end portion of said connecting member enabling movement of said connecting member in said plane parallel to said face of said camera body, and a connection being slidable in direction of said optical axis of said lens and arranged between the other end portions of said movable connecting member and said adjusting means of said diaphragm member enabling adjustment of the same by said diaphragm controlling member in various positions of said adjusting means of said diaphragm member along said optical axis of said lens, whenever required.

2. In a photographic camera, a camera lens, a lens mount carrying said lens slidable in direction of the optical axis of said lens, a camera body housing said slidable lens and lens mount and having an at least substantially flat face being parallel to said optical axis of said camera lens, an adjustable diaphragm member carried by said lens mount, adjusting means on said diaphragm member for adjusting the same, a diaphragm controlling member arranged on said face of said camera body, means turnably securing said diaphragm controlling member to said face of said camera body, an at least substantially longitudinal slidable connecting member arranged in a plane parallel to said face of said camera body, means securing said longitudinal connecting member to said face of said camera body slidably in longitudinal direction of said connecting member, a sliding connection between said controlling member and one end of said longitudinal slidable connecting member enabling sliding of said connecting member to and fro in longitudinal direction in said plane parallel to said face of said camera body, and a connection being slidable in direction of said optical axis of said lens and arranged between the other end of said longitudinal slidable connecting member and said adjusting means of said diaphragm member enabling adjustment of the same by said diaphragm controlling member in various positions of said adjusting means of said diaphragm member along said optical axis of said lens, whenever required.

3. In a photographic camera, a camera lens, a lens mount carrying said lens slidable in direction of the optical axis of said lens, a camera body housing said slidable lens and lens mount and having an at least substantially flat face being parallel to said optical axis of said camera lens, an adjustable diaphragm member carried by said lens mount, adjusting means on said diaphragm member for adjusting the same by turning said adjusting means about said optical axis of said camera lens, a diaphragm controlling member arranged on said face of said camera body, means turnably securing said diaphragm controlling member to said face of said camera body, an at least substantially longitudinal slidable connecting member arranged in a plane parallel to said face of said camera body with its longitudinal axis in said plane and also in a plane being normal to said optical axis of said camera lens, means securing said longitudinal connecting member to said face of said camera body slidably in longitudinal direction of said connecting member, a sliding connection between said controlling member and one end of said longitudinal slidable connecting member enabling sliding of said connecting member to and fro in longitudinal direction, and a connection being slidable in direction of said optical axis of said lens and arranged between the other end of said longitudinal slidable connecting member and said adjusting means of said diaphragm member enabling adjustment of the same by said diaphragm controlling member in various positions of said adjusting means of said diaphragm member along said optical axis of said lens, whenever required.

JACQUES BOLSEY.